(12) United States Patent
De Jong

(10) Patent No.: US 12,489,396 B2
(45) Date of Patent: Dec. 2, 2025

(54) SOLAR PANEL SHUT-OFF SYSTEM

(71) Applicant: Bruce De Jong, Reno, NV (US)

(72) Inventor: Bruce De Jong, Reno, NV (US)

( * ) Notice: Subject to any disclaimer, the term of this patent is extended or adjusted under 35 U.S.C. 154(b) by 276 days.

(21) Appl. No.: 18/382,493

(22) Filed: Oct. 21, 2023

(65) Prior Publication Data

US 2025/0132723 A1    Apr. 24, 2025

(51) Int. Cl.
*H02S 40/34* (2014.01)
*B60P 3/32* (2006.01)
*B60R 16/033* (2006.01)
*H02J 7/00* (2006.01)
*H02J 7/35* (2006.01)
*H02S 40/38* (2014.01)

(52) U.S. Cl.
CPC ............ *H02S 40/34* (2014.12); *B60R 16/033* (2013.01); *H02J 7/00302* (2020.01); *H02J 7/35* (2013.01); *H02S 40/38* (2014.12); *B60P 3/32* (2013.01)

(58) Field of Classification Search
CPC ................. B60P 3/32; H02J 7/00302; B60R 16/00–16/08; H02S 40/38
See application file for complete search history.

(56) References Cited

U.S. PATENT DOCUMENTS

| | | | |
|---|---|---|---|
| 3,719,244 A * | 3/1973 | Miller | B60P 3/32 |
| | | | D12/100 |
| D514,528 S | 2/2006 | Beaton | |
| D798,231 S | 9/2017 | Duenser | |
| 9,812,869 B2 * | 11/2017 | Narla | H02S 40/38 |
| 9,843,193 B2 | 12/2017 | Getsla | |
| 11,177,770 B2 | 11/2021 | Xu | |
| 11,532,935 B2 | 12/2022 | Zhu | |
| 11,621,552 B2 | 4/2023 | Yoneda | |
| 2017/0217321 A1 * | 8/2017 | Sekiya | H02S 40/34 |
| 2022/0239107 A1 * | 7/2022 | Qiu | H02J 3/32 |
| 2022/0278525 A1 | 9/2022 | Kojima | |
| 2023/0015701 A1 * | 1/2023 | Katkuri | B60L 53/51 |

FOREIGN PATENT DOCUMENTS

WO    WO2019167500    9/2019

* cited by examiner

*Primary Examiner* — Kourtney R S Carlson

(57) ABSTRACT

A solar panel shut-off system for remotely shutting down an electrical connection between a solar panel and a controller or a battery includes a vehicle having a rooftop, a base, and a sidewall extending therebetween. A solar panel is mounted to the rooftop. A battery is electronically coupled to the solar panel. A controller is electronically coupled to the solar panel and the battery to regulates a flow of electricity between the battery and the solar panel. A shutdown switch is electrically coupled to the solar panel and the controller. The shutdown switch selectively opens an electrical circuit between the solar panel and the controller. A remote activation mechanism is electronically coupled to the shutdown switch and triggers the shutdown switch to open the electrical circuit. The remote activation mechanism is generally positioned no more than 5.0 feet above the base of the vehicle.

8 Claims, 5 Drawing Sheets

SOLAR PANEL SHUT-OFF SYSTEM

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to shut-off units and more particularly pertains to a new shut-off unit for remotely shutting down an electrical connection between a solar panel and a solar panel charger or a battery using the battery as the sole power source.

(2) Description of Related Art Including Information Disclosed Under 37 CFR 1.97 and 1.98

The prior art relates to shut-off units. Solar panels have been implemented into mobile homes and other off-grid homes and living spaces. These solar panels are typically connected to batteries that power the homes, which the panels charge when the sun is shining. Such systems may include a controller that regulates the voltage and current coming from the solar panel to the battery, thereby inhibiting the battery from overcharging. The panels are typically mounted to the rooftop of the recreational vehicle or boat because that is the area that receives the most exposure to sunlight. Such systems may also include switches or control circuits that can disconnect the solar panel from the battery. However, the switches are typically only accessible from the rooftop, where the panels are installed, and thus are difficult for a user to reach in an emergency. This can lead to overcharging of the batteries, which reduces their lifespan and efficacy, even with a controller coupled to the panels. Thus, there is a need in the art for a shutdown switch that can disrupt the electrical circuit between a solar panel and a battery and that is easily accessible to a user from ground level. Additionally, there is a need for a system that can be easily shut off during maintenance to improve safety.

BRIEF SUMMARY OF THE INVENTION

An embodiment of the disclosure meets the needs presented above by generally comprising a recreational vehicle having a rooftop, a base, and a sidewall extending therebetween. A solar panel is mounted to the rooftop. A battery is electronically coupled to the solar panel. The battery holds an electrical charge generated by the solar panel. A controller is electronically coupled to the solar panel and the battery. The controller regulates a flow of electricity between the battery and the solar panel thereby inhibiting the battery from overcharging. A shutdown switch is electrically coupled to the solar panel and the controller. The shutdown switch selectively opens an electrical circuit between the solar panel and the controller thereby disconnecting the solar panel from the battery and the controller. A remote activation mechanism is electronically coupled to the shutdown switch. The remote activation mechanism triggers the shutdown switch to open the electrical circuit. The remote activation mechanism is generally positioned on the sidewall of the recreational vehicle, for example being positioned no more than 5.0 feet above the base. The remote activation mechanism may be powered by the battery coupled to the solar panel.

There has thus been outlined, rather broadly, the more important features of the disclosure in order that the detailed description thereof that follows may be better understood, and in order that the present contribution to the art may be better appreciated. There are additional features of the disclosure that will be described hereinafter, and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
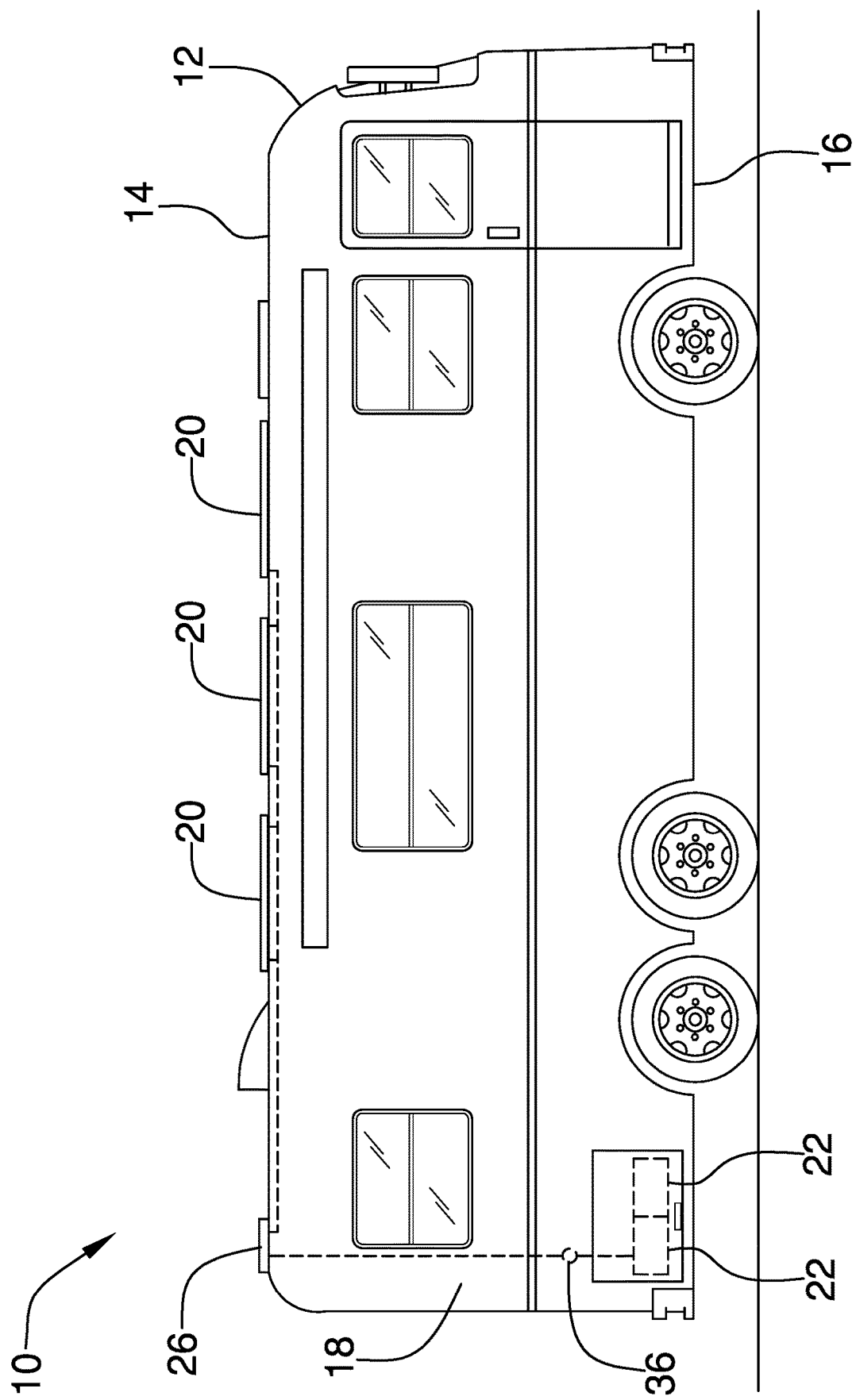
FIG. 1 is a side view of a solar panel shut-off system according to an embodiment of the disclosure.

With reference now to the drawings, and in particular to FIGS. 1 through 6 thereof, a new shut-off unit embodying the principles and concepts of an embodiment of the disclosure and generally designated by the reference numeral 10 will be described.

Figure 2:
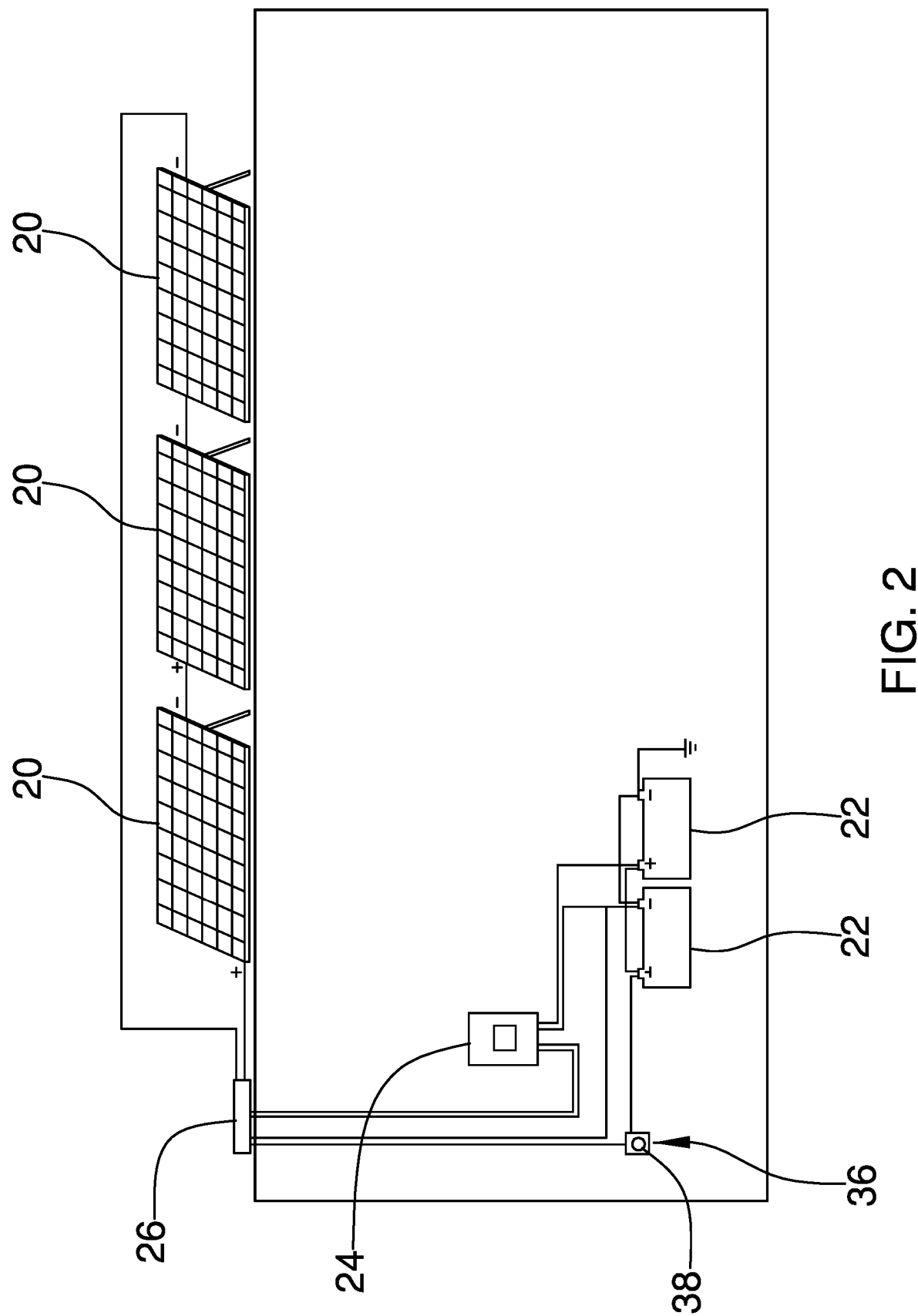
FIG. 2 is a detail view of an embodiment of the disclosure.
Figure 3:
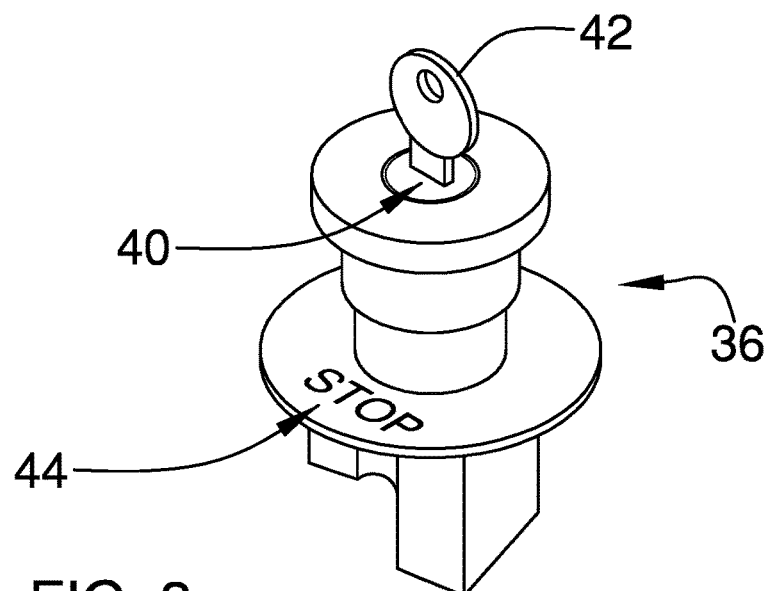
FIG. 3 is a detail isometric view of an embodiment of the disclosure.
Figure 4:
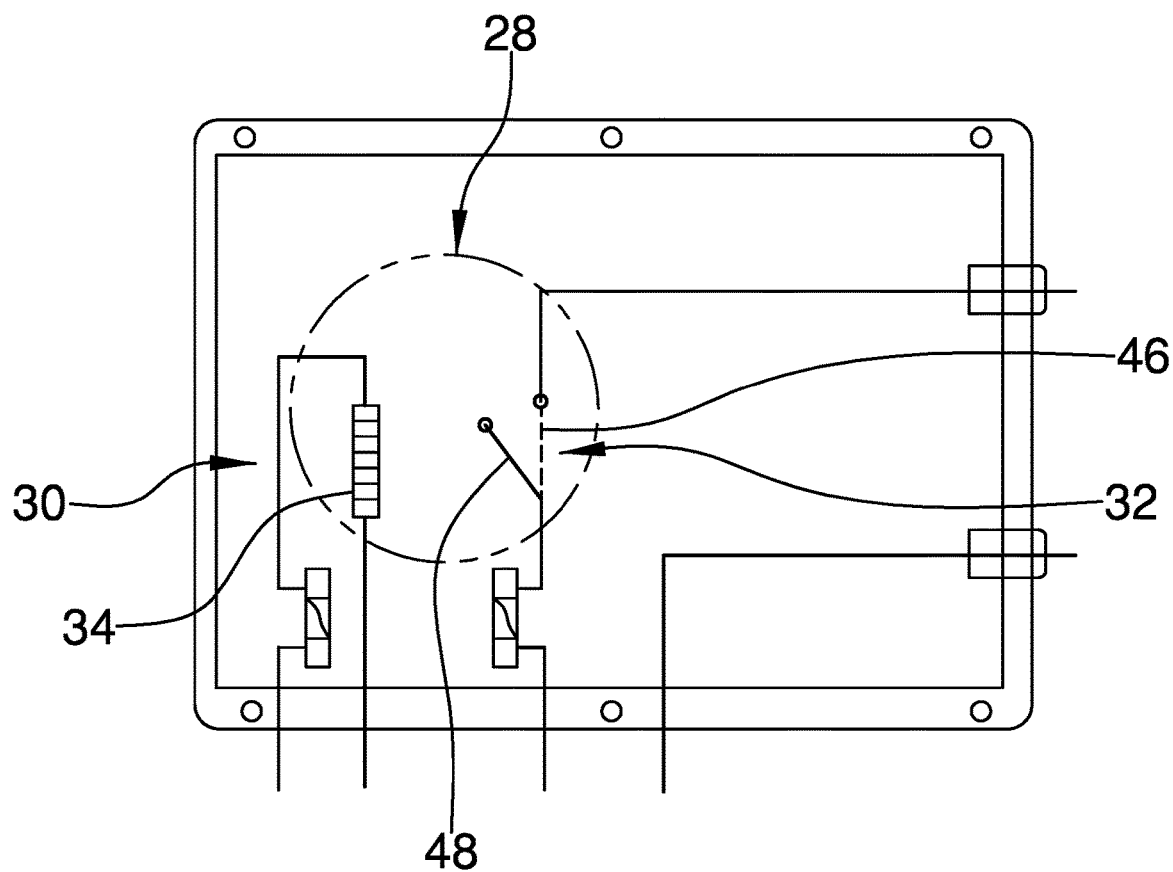
FIG. 4 is a detail view of an embodiment of the disclosure.
Figure 5:
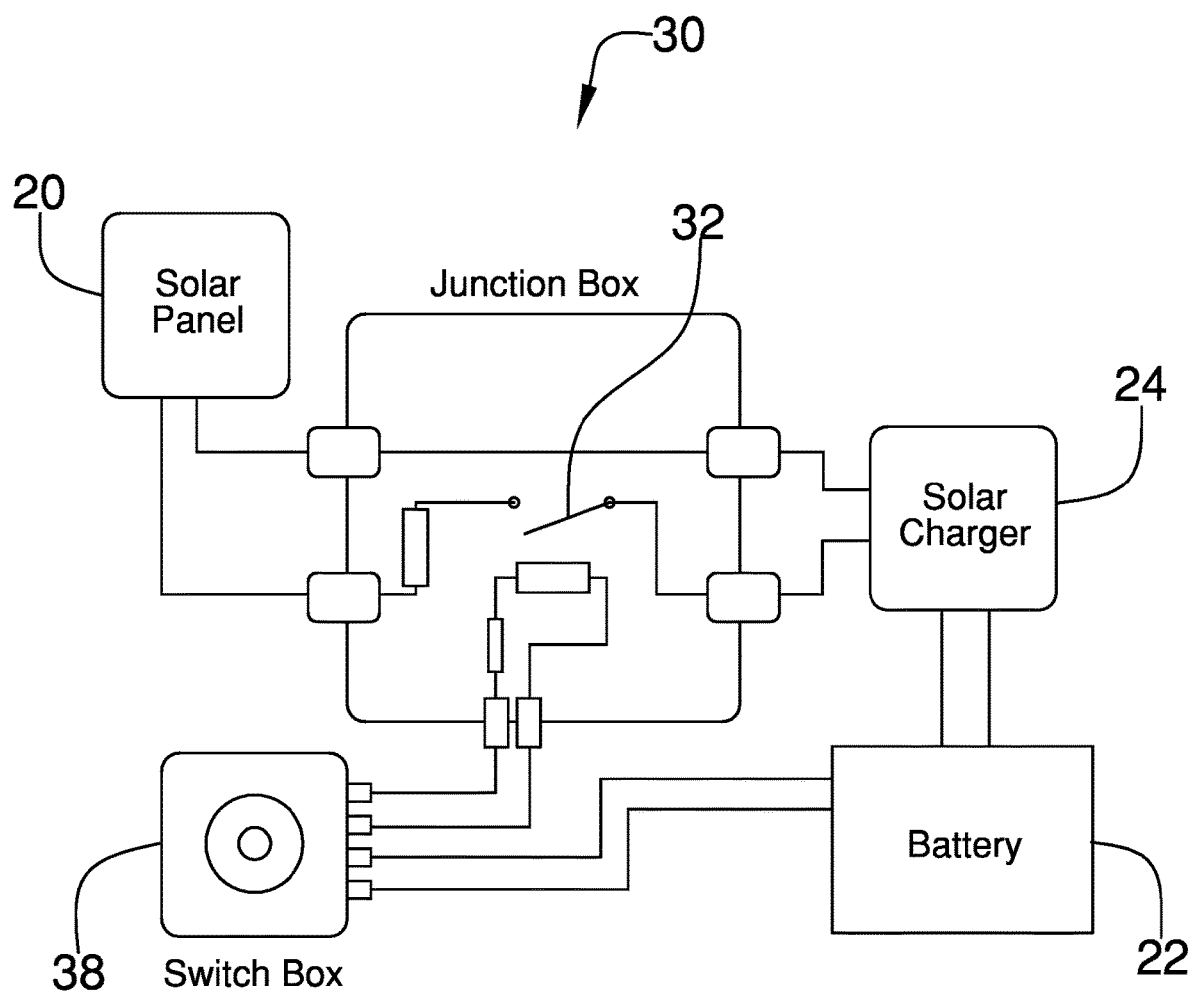
FIG. 5 is a block diagram view of an embodiment of the disclosure.
Figure 6:
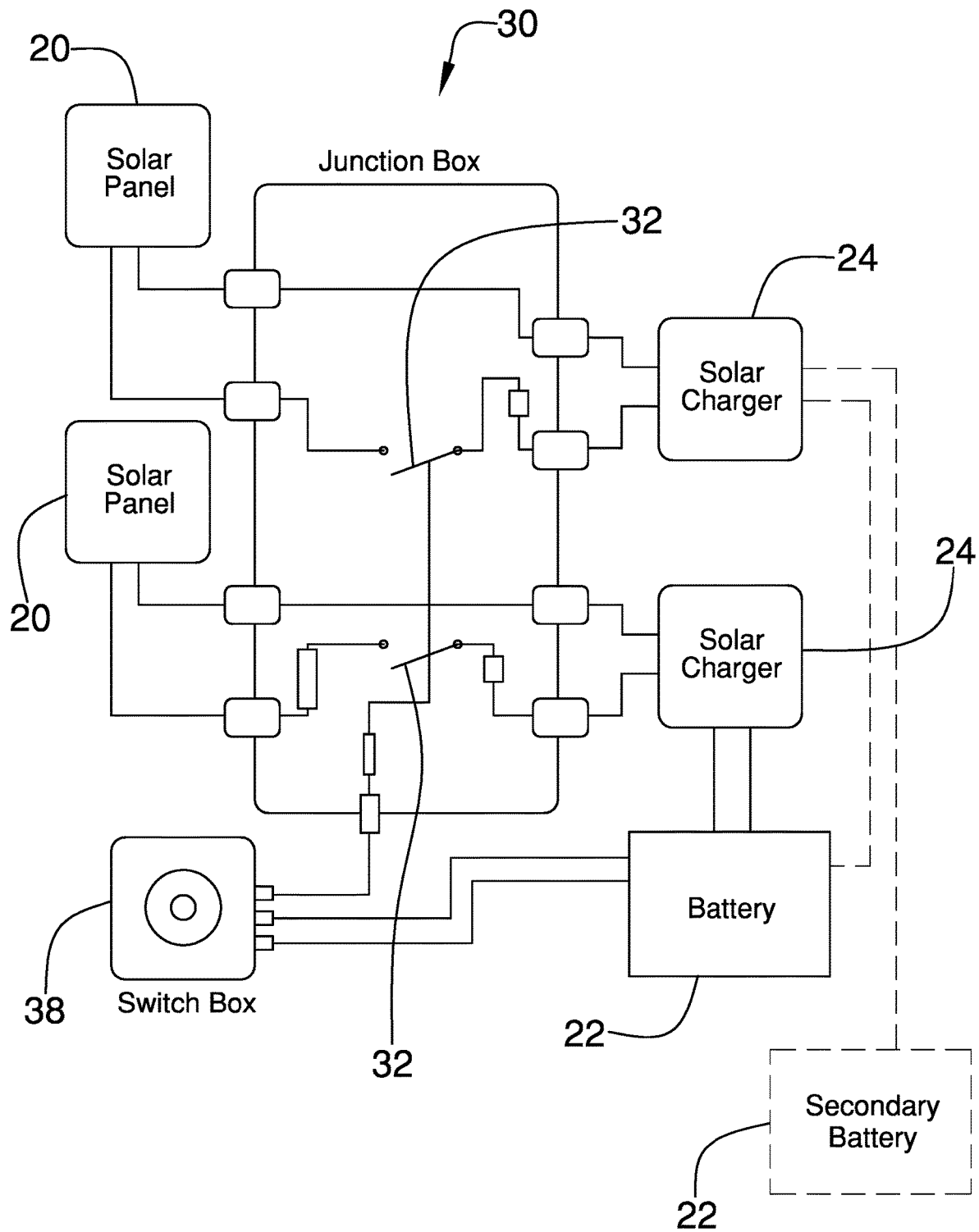
FIG. 6 is a block diagram view of an embodiment of the disclosure.

As best illustrated in FIGS. 1 through 6, the solar panel shut-off system 10 generally comprises a recreational vehicle 12 having a rooftop 14, a base 16, and a sidewall 18 extending therebetween. A solar panel 20 is mounted to the rooftop 14. A battery 22 is electronically coupled to the solar panel 20. The battery 22 holds an electrical charge generated by the solar panel 20. A controller 24, such as a solar charger, is electronically coupled to the solar panel 20 and the battery 22. The controller 24 regulates a flow of electricity between the solar panel 20 and the battery 22 thereby inhibiting the battery 22 from overcharging. A cable entry plate 26 may be mounted to the rooftop 14. For example, the solar panel 20 may be electronically coupled to the battery 22 and the controller 24 through the cable entry plate 26, as shown in FIG. 2.

A shutdown switch 28 is electronically coupled to the solar panel 20 and the controller 24. The shutdown switch 28 selectively opens an electrical circuit 30 between the solar panel 20 and the controller 24 thereby disconnecting the solar panel 20 from the battery 22 and the controller 24. The shutdown switch 28 may be positioned on the cable entry plate 26. The shutdown switch 28 may be a rapid shutdown device. Embodiments of the shutdown switch generally include a switch 32 that is positioned within the electrical circuit 30. The switch 32 has an on position 46 and an off position 48. The switch 32 closes the electrical circuit 30 when the switch 32 is in the on position 46. The switch 32 opens the electrical circuit 30 when the switch 32 is in the off position 48. In some embodiments, the switch 32 comprises a single pole single throw switch. An actuator 34 may be electronically coupled with the switch 32. The actuator 34 turns the switch 32 between the on position 46 and the off position 48. For example, the actuator may be a solenoid. In embodiments, the shutdown switch 28 may be powered by direct current. For example, the shutdown switch 28 may be a rapid shutdown device that is powered by direct current. The switch 32 and the actuator 34 may also be powered by direct current.

A remote activation mechanism 36 is electronically coupled to the shutdown switch 28, for example being electrically coupled through the cable entry plate 26. The remote activation mechanism 36 triggers the shutdown switch 28 to open the electrical circuit 30. The remote activation mechanism 36 is positioned on the sidewall 18 of the recreational vehicle 12 in a conveniently accessible location from the ground. For example, the remote activation mechanism 36 may be positioned no more than 5.0 feet above the base 16 in some embodiments. In other embodiments, the remote activation mechanism 36 may be positioned within the interior of the recreational vehicle 12, such as in the cab of the recreational vehicle 12 near the driver's or passenger's seats. The remote activation mechanism 36 will be easy for a user to access and use without requiring the user to climb to the rooftop 14 to access the solar panel 20 or requiring the user to access the shutdown switch 28 or the controller 24 themselves. The remote activation mechanism 36 may be powered by the battery 22 coupled to the solar panel 20.

In some embodiments, the remote activation mechanism 36 generally comprises a switch box 38 that is electrically coupled to the shutdown switch 28. The switch box 38 may have a keyhole 40 therein for insertably receiving a key 42 thereby facilitating the remote activating mechanism 36 in triggering the shutdown switch 28 to open the electrical circuit 30. For example, the key 42 may turn to a stop position 44 when the key 42 is inserted into the keyhole 40. Once in the stop position 44, the remote activation mechanism 36 triggers the actuator 34 to turn the switch 32 to the off position 48.

In use, the user can actuate the remote activation mechanism 36 to shut off or disconnect the power coming from the solar panel 20. This remote activation mechanism 36 will trigger the shutdown switch 28, for example to inhibit the battery 22 from overcharging. The remote activation mechanism 36 can be installed in recreational vehicles 12, as shown in FIG. 1. The remote activation mechanism 36 can also be installed with solar power systems that are used with boats, mobile homes, or other off-grid systems that rely on solar panels for power. Rather than needing to access the shutdown switch 28 or the controller 24, the user can simply actuate the remote activation mechanism 36 which will be positioned within easy reach from ground level to disconnect the solar panel 20 from the battery 22 whenever necessary.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the elements is present, unless the context clearly requires that there be only one of the elements.

I claim:

1. A solar panel shut-off system comprising:
   a recreational vehicle having a rooftop, a base, and a sidewall extending therebetween;
   a solar panel being mounted to the rooftop;
   a battery being electronically coupled to the solar panel, the battery holding an electrical charge generated by the solar panel;
   a controller being electronically coupled to the solar panel and the battery, the controller regulating a flow of electricity between the solar panel and the battery thereby inhibiting the battery from overcharging;
   a shutdown switch being electrically coupled to the solar panel and the controller, the shutdown switch being configured to selectively open an electrical circuit between the solar panel and the controller thereby disconnecting the solar panel from the battery and the controller; and
   a remote activation mechanism being electronically coupled to the shutdown switch through a cable entry plate, the remote activation mechanism triggering the shutdown switch to open the electrical circuit, the remote activation mechanism being positioned on the sidewall of the recreational vehicle no more than 5.0 feet above the base.

2. The solar panel shut-off system of claim 1, further comprising the cable entry plate being mounted to the rooftop, the solar panel being electronically coupled to the battery and the controller through the cable entry plate.

3. The solar panel shut-off system of claim 1, the shutdown switch further comprising a rapid shutdown device.

4. The solar panel shut-off system of claim 1, the shutdown switch further comprising:
   a switch being positioned within the electrical circuit, the switch having an on position and an off position, the switch closing the electrical circuit when the switch is in the on position, the switch opening the electrical circuit when the switch is in the off position; and
   an actuator being electronically coupled with the switch, the actuator turning the switch between the on position and the off position, the actuator being a solenoid.

5. The solar panel shut-off system of claim 4, the switch further comprising a single pole single throw switch.

6. The solar panel shut-off system of claim 4, the remote activation mechanism further comprising:
   a switch box being electrically coupled to the shutdown switch, the switch box having a keyhole therein for insertably receiving a key thereby facilitating the remote activating mechanism in triggering the shutdown switch to open the electrical circuit; and
   wherein the key turns to a stop position when the key is inserted into the keyhole, the stop position triggering the actuator to turn the switch to the off position.

7. The solar panel shut-off system of claim 1, wherein the shutdown switch is powered by direct current.

8. A solar panel shut-off system comprising:
   a recreational vehicle having a rooftop, a base, and a sidewall extending therebetween;
   a solar panel being mounted to the rooftop;
   a battery being electronically coupled to the solar panel, the battery holding an electrical charge generated by the solar panel;
   a controller being electronically coupled to the solar panel and the battery, the controller regulating a flow of electricity between the solar panel and the battery thereby inhibiting the battery from overcharging;
   a cable entry plate being mounted to the rooftop, the solar panel being electronically coupled to the battery and the controller through the cable entry plate;
   a shutdown switch being electronically coupled to the solar panel and the controller, the shutdown switch selectively opening an electrical circuit between the solar panel and the controller thereby disconnecting the solar panel from the battery and the controller, the shutdown switch being positioned on the cable entry plate, the shutdown switch being a rapid shutdown device, the shutdown switch comprising:
      a switch being positioned within the electrical circuit, the switch having an on position and an off position, the switch closing the electrical circuit when the switch is in the on position, the switch opening the electrical circuit when the switch is in the off position, the switch comprising a single pole single throw switch;
      an actuator being electronically coupled with the switch, the actuator turning the switch between the on position and the off position, the actuator being a solenoid; and
   a remote activation mechanism being electronically coupled to the shutdown switch through the cable entry plate, the remote activation mechanism triggering the shutdown switch to open the electrical circuit, the remote activation mechanism being positioned on the sidewall of the recreational vehicle no more than 5.0 feet above the base.

\* \* \* \* \*